United States Patent

McMillan et al.

[11] Patent Number: 5,926,176
[45] Date of Patent: Jul. 20, 1999

[54] CONTROL PROGRAM TRACKING AND DISPLAY SYSTEM

[75] Inventors: Andrew H. McMillan, Plymouth; Brent Allen Bartson, Saline; James Alan Steenstra; Lee Reid, both of Ann Arbor, all of Mich.

[73] Assignee: Think & Do Software, Inc., Ann Arbor, Mich.

[21] Appl. No.: 08/904,485

[22] Filed: Jul. 31, 1997

[51] Int. Cl.$^6$ .................................................. G06F 3/00
[52] U.S. Cl. ......................... 345/339; 395/704; 345/966
[58] Field of Search .................................. 345/349, 329, 345/331, 333, 334, 335, 339, 346, 348, 966; 395/704, 702

[56] References Cited

U.S. PATENT DOCUMENTS

| | | | |
|---|---|---|---|
| 4,852,047 | 7/1989 | Lavallee et al. | 364/191 |
| 5,408,603 | 4/1995 | Van de Lavoir et al. | 345/349 |
| 5,410,648 | 4/1995 | Pazel | 345/346 |
| 5,652,874 | 7/1997 | Upson et al. | 345/326 |

*Primary Examiner*—Raymond J. Bayerl
*Assistant Examiner*—Cao H. Nguyen
*Attorney, Agent, or Firm*—Harness, Dickey & Pierce, P.L.C.

[57] ABSTRACT

Control program statements are graphically displayed as flowchart logic. The runtime engine associated with the process control computer monitors and maintains state data indicating whether a program statement was executed on every pass, on at least one but not all passes, or never. This state information is used by the program tracker to render the graphically displayed program blocks in a different color or other visual indicia, allowing the user to perceive what program branches the runtime program actually took during operation. The user is thus provided with useful logic flow information even though the executing program may operate cyclically at a speed faster than the user can directly perceive.

13 Claims, 6 Drawing Sheets

CONTROL PROGRAM TRACKING AND DISPLAY SYSTEM

BACKGROUND AND SUMMARY OF THE INVENTION

The present invention relates generally to systems for tracking the operation of a control program and for displaying a graphical representation of the program's behavior as it performs runtime control program operations. More specifically, the invention relates to an improved tracking and display system that supplies a useful visual indication of the logic flow within the control program. The visual indication may use different colors or line style of flowchart block outlines to show which paths of logic have been and are being executed in the run-time engine.

Control programs supply the instructions used by computers and automated manufacturing systems to perform a variety of tasks. By way of example, a control program may be supplied to a manufacturing control computer or process control computer that is responsible for automating a manufacturing task. Today, complex systems of all types are run by computers executing control programs.

During the design and debugging of control programs, the system engineer or programer may benefit from watching the program operate under various different conditions. Watching the program operate can be particularly helpful where the logic is complex, with many conditional branches in the logic flow.

One way to accomplish this is to place the control program in a single step mode, where the program pauses between each program step or breakpoint, allowing the engineer or programmer to inspect all relevant data values to thereby understand whether the program is operating correctly, and if not, why not. Single step debugging techniques are not suitable for all types of control programs. In particular, control programs that input or output data to real time systems simply may not work correctly when single stepped at slow speed.

To make it easier for the engineer or programmer to visualize how a control program is operating, some development systems and debugging systems graphically display flowcharts, where the flow through conditional branches is designated by a visual attribute. Specifically, program statements, including conditional branching statements, are shown by flowchart symbols, and these symbols may be highlighted or not highlighted to show whether they were invoked or were not invoked during control program operation.

The conventional flowcharting display technique is not very useful in certain types of control programs that operate at very high speed. Although the flowchart display program might theoretically keep pace with the operating control program, the screen display and the engineer or programmer watching it simply cannot. To illustrate, consider a control program that operates cyclically at 50 cycles per second, where each cycle may invoke different logic flow branches than the cycle before it. The human operator simply cannot absorb information at this 50 cycle-per-second rate. Thus, even if the flowchart display program were to display flow through each cycle, the human operator would see only a blur.

The present invention affords an improved graphical representation of a control program's behavior. The computer-implemented control program tracker of the invention gives the user useful runtime information even if the control program is operating at a speed too high for the human to perceive directly.

The computer-implemented control program tracker employs a runtime engine that includes a monitor module for monitoring the runtime performance of control program operations specified by the control program. A memory data structure, accessed by the runtime engine, stores a representation of the control program as a plurality of blocks. Each block corresponds to at least one of the control program steps or operations. The memory data structure stores block state information associated with the runtime performance of the control program as it operates.

The computer-implemented program tracker further includes a graphical display engine that generates spatially arranged graphical objects that correspond to the plurality of blocks. The objects are arranged to convey information about the relationship of the control program operations. In a preferred embodiment, the display engine generates graphical displays that resemble conventional flowcharts, although other types of program display notation may also be implemented.

A tracking module accesses the memory data structure and communicates with the graphical display engine to selectively impart different visual representations to the graphical objects. In the preferred embodiment, different colors, or different line thicknesses or shading, are used to reflect the runtime performance of the control program. Although different arrangements are possible, the presently preferred implementation identifies at least three different states that correspond to different runtime performance conditions. The states include: (a) always executed, (b) sometimes executed, (c) never executed. Different colors are assigned to each of these three states, and these colors are used by the graphical display engine when the graphical objects are displayed to the user. The user can then readily determine from the graphical object colors how the control program has been performing, even if the control program operates at high speed.

The invention can be incorporated into a variety of different applications, including program control development environments, debugging systems and runtime operating system environments, to name a few. For a more complete understanding of the invention, its objects and advantages, reference may be had to the following specification and to the accompanying drawings.

DESCRIPTION OF THE PREFERRED EMBODIMENT

Figure 1:
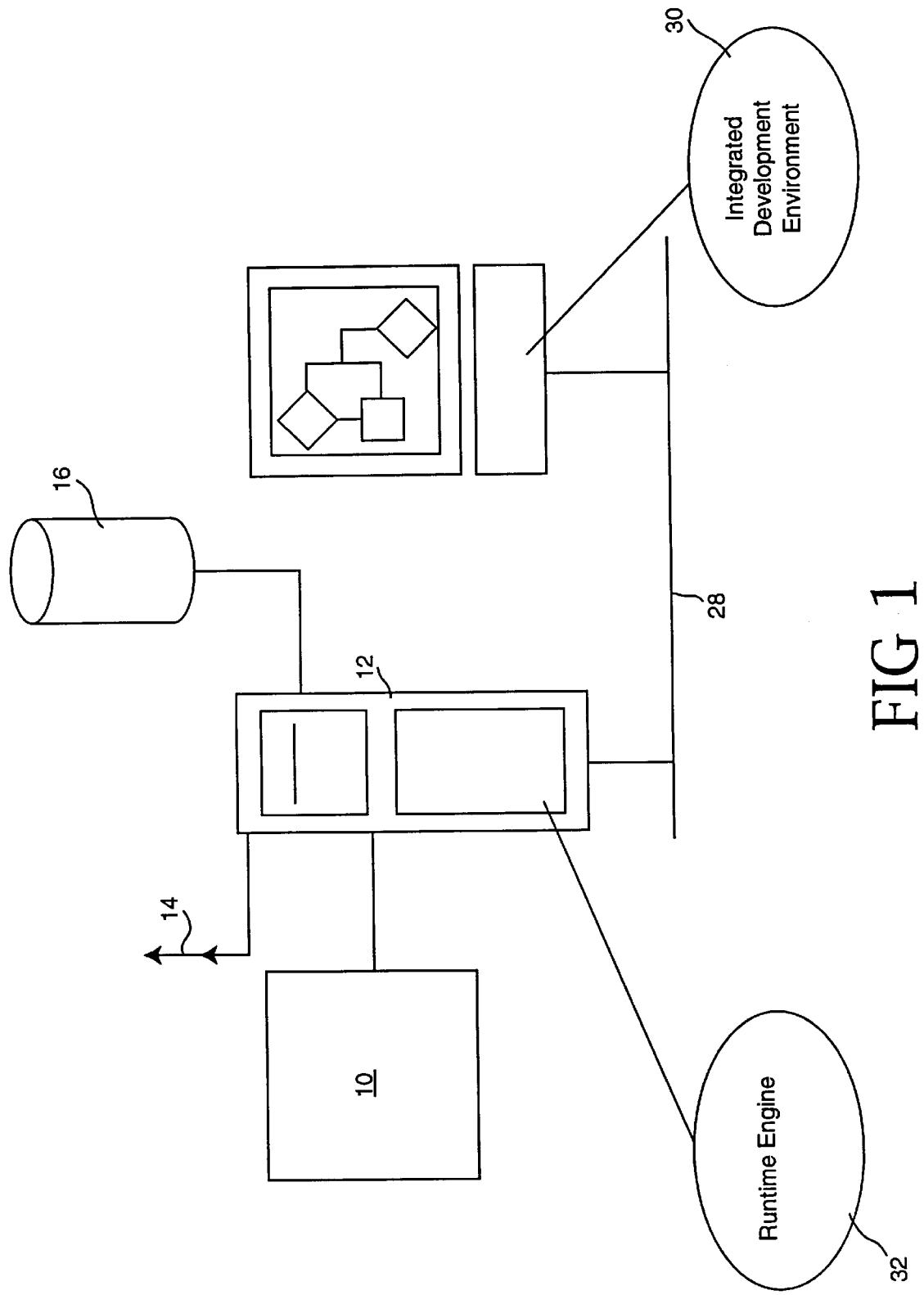
FIG. 1 is a system overview block diagram, illustrating one possible implementation of the control program tracker in accordance with the present invention.

The control program tracker of the invention can be implemented in a variety of different working embodiments. For purposes of illustration, the invention will be disclosed in the context of a process control or manufacturing control system, of the type commonly employed in manufacturing operations. In this regard, FIG. 1 shows an exemplary implementation. The manufacturing operations are performed by machine 10 under the control of a process control computer 12. The process control computer performs control program instructions for operating machine 10. Machine operation may be dependent upon one or more measured variables supplied by one or more external sensors 14. Typically the process control computer 12 includes a file storage mechanism such as disk drive 16 for storing the control program that is to be executed.

In general, the control program can comprise a series of program operations that are involved in gathering data from the sensors, processing the data and making control decisions based on the data, and supplying machine control instructions to machine 10. The control program or programs may be compiled programs, designed to run directly by the control computer's processor; or, the control programs may be interpreted control programs, designed to be run by an intermediate translator or interpreter. The system of the invention will work in both contexts.

Figure 2:
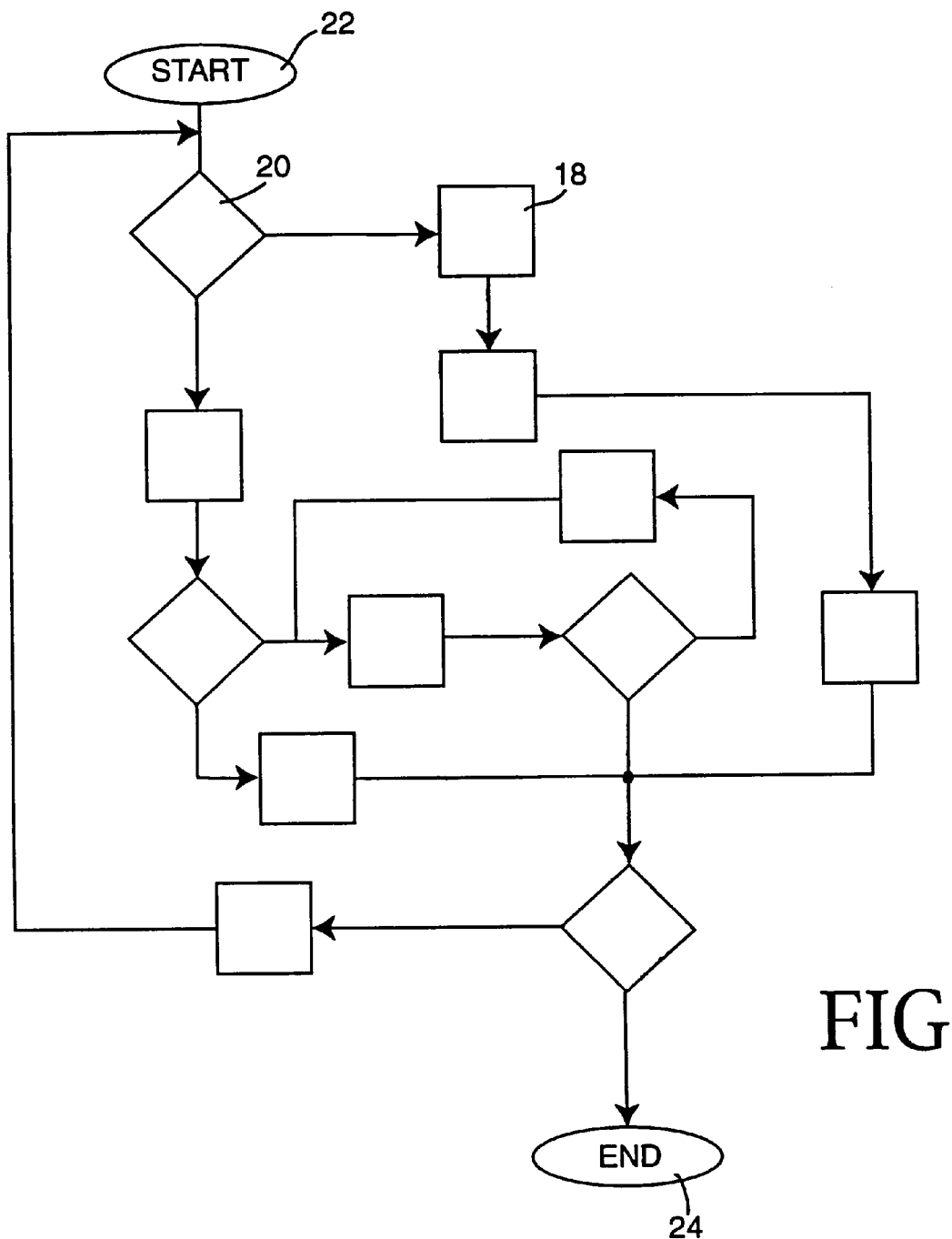
FIG. 2 is an exemplary flowchart corresponding to a control program of the type that may be tracked using the invention.

The control program will typically comprise program operations or groups of operations that fall into different functional categories. In many instances, these program operations may be graphically depicted as blocks in a flowchart. FIG. 2 shows an example of such a flowchart. In FIG. 2 the rectangular blocks, such as block 18 represent control blocks. Note that each control block has one entry point and one exit point, denoted by the incoming and outgoing arrows, respectively. Each control block may represent a single program operation or a group of related operations.

The diamond shaped blocks, such as block 20 in FIG. 2 are decision blocks. These blocks have one entry point and two exit points. Program control flow or logic flow is diverted to one exit point or the other, depending upon the outcome of a decision performed at the decision block. Decision blocks thus allow the control program to exhibit conditional branching. It is this conditional branching that will cause the program control logic to flow through one branch during a first control cycle and through a second branch through a later control cycle.

In FIG. 2 the control program has been provided with start and end nodes 22 and 24 to illustrate where the control program cycle begins and where it ends. In many real-time control applications, the control program will perform numerous (possibly continuous) looping cycles. Thus reaching the end mode 24 simply causes the control program to jump immediately to the start node 22 where the cycle begins again.

In configuring the process control computer 12, the system engineer or programmer will typically write one or more control programs using a suitable application development software system. The present invention is designed to integrate with this development system. In FIG. 1 a workstation 26 communicates with the process control computer 12 over a suitable network 28. The workstation provides an integrated development environment (IDE) 30 that the system engineer or programmer will use in developing the control program. If desired, the control program and the integrated development environment can be run on the same computer or work station.

In the illustrated embodiment the integrated development environment provides a graphical programming environment in which the system engineer or programmer will construct control programs by selecting and configuring graphically displayed control blocks and decision blocks. The integrated development environment generates source code based on the graphically designed flowchart. This source code is then compiled and the executable code communicated over network 28 to the process control computer 12. Typically the control program will be stored as a file on disk drive 16. The process control computer then loads this file and runs the executable code contained in the file.

The control computer 12 functions as a runtime engine (RTE) 32. In one implementation the runtime engine performs the control program and directly controls machine 10 through a suitable input/output controller card installed in the process control computer. In an alternate embodiment the runtime engine 32 provides control instructions to an embedded controller comprising part of the machine 10, and the embedded controller then operates the machine based on instructions from the runtime engine.

In the presently preferred embodiment the runtime engine 32 communicates with the integrated development environment through message passing. The message passing technique is used to communicate state information between the runtime engine and the integrated development environment. This state information is then used to impart different visual representations to the graphical objects displayed on the monitor work station 26.

Whereas the compiled control program is communicated from workstation 26 to process control computer 12 as a file for storage on disk drive 16, the messages passed between runtime engine 32 and integrated development environment 30 are communicated and stored in random access system memory. The presently preferred implementation uses the Microsoft OLE System for message passing. Although both runtime engine and integrated development environment can be based on the same memory model architecture, this is not a requirement. Thus the runtime engine may be implemented as a 32-bit application, whereas the integrated development environment may be implemented as a 16-bit application. Suitable memory conversion techniques will need to be employed when mixed memory model implementations are used.

Figure 3:
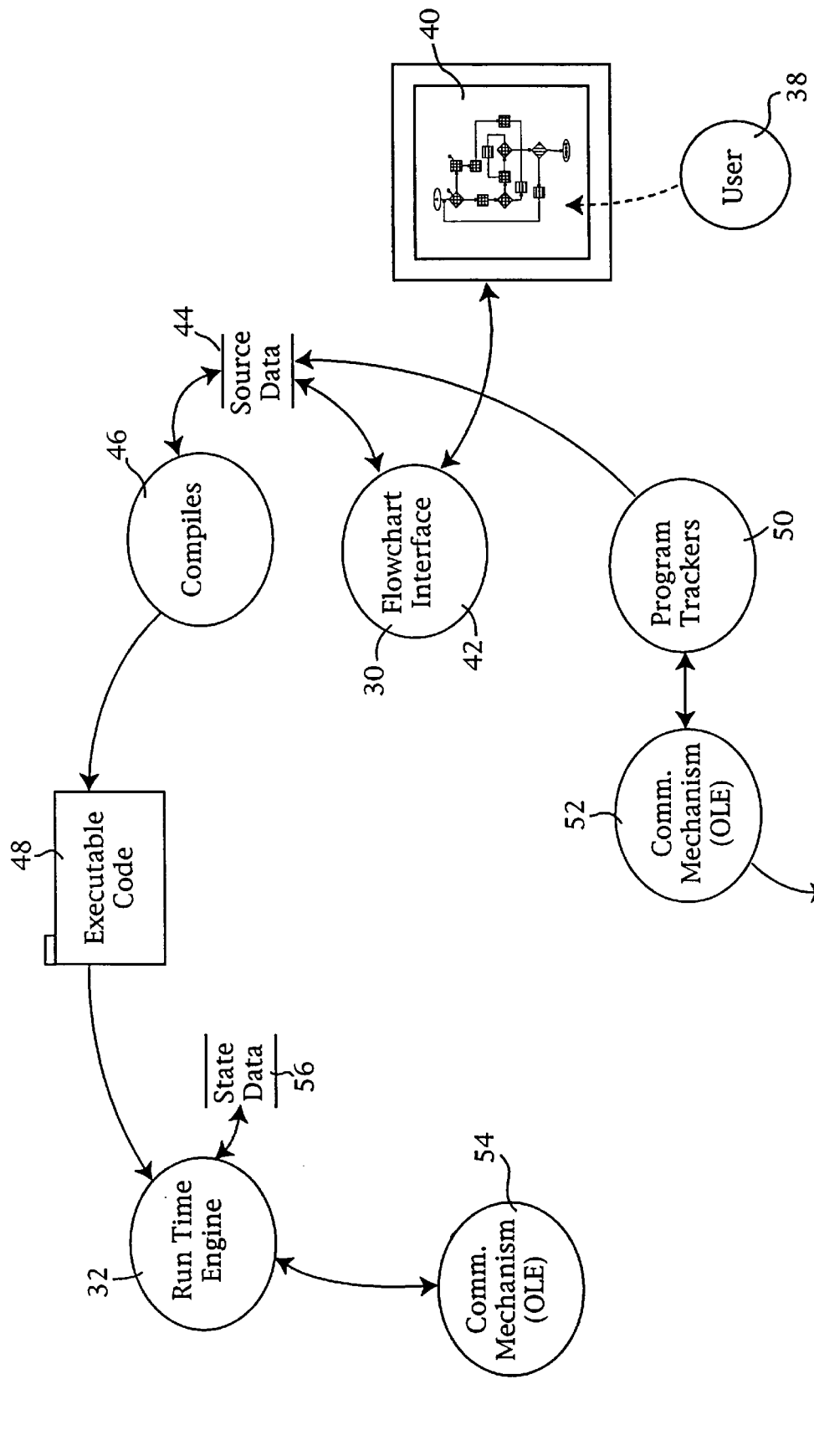
FIG. 3 is a software component diagram, illustrating the primary components and interfaces of the presently preferred embodiment.

FIG. 3 gives an overview of the basic components involved in the presently preferred implementation. The user 38 (system engineer or control programmer) views the graphical user interface 40 that is maintained by the flowchart interface module 42. In FIG. 3 the connection between user 38 and graphical user interface 40 is shown as a dashed line to remind that the user is typically not capable of perceiving rapid state changes that the remainder of the system is technically capable of communicating. As will be more fully explained, the system accommodates the user's considerably lower "bandwidth" by providing a graphical display that imparts different visual representations to the graphical objects, to reflect runtime performance of the control program. In an exemplary embodiment the display will use different colors to show which branches of the control program (a) always execute, (b) sometimes execute and (c) never execute. User 38 interacts with the system through flowchart interface 42 to graphically develop control programs. These control programs are stored as source data 44 in a suitable data store. Compiler 46 translates the source code control programs into executable code that is communicated through file 48 to the runtime engine 32.

Flowchart interface 42, compiler 46 and the associated data store 44 comprise the primary components of the integrated development environment 30. The program tracker of the invention is depicted at 50. As illustrated, the program tracker may be coupled to the integrated development environment 30 such that it has access to the source data 44. Program tracker 50 has an associated communication mechanism 52 such as a Microsoft OLE mechanism. Runtime engine 32 is similarly provided with a communication mechanism 54, which may also be a Microsoft OLE mechanism. The communication mechanisms 52 and 54 pass messages through a suitable connection such as the network 28.

As will be more fully explained below, the runtime engine 32 maintains a data store of state data 56. These state data record the runtime performance of the control program, by maintaining a record of how many times each program block was executed during a predetermined number of program cycles. If desired, state data may be recorded for each control block and each decision block that makes up the control program. Alternatively, the state data can be maintained for only the decision blocks, recording the number of time the decision block evaluated as TRUE and FALSE.

Figure 4:
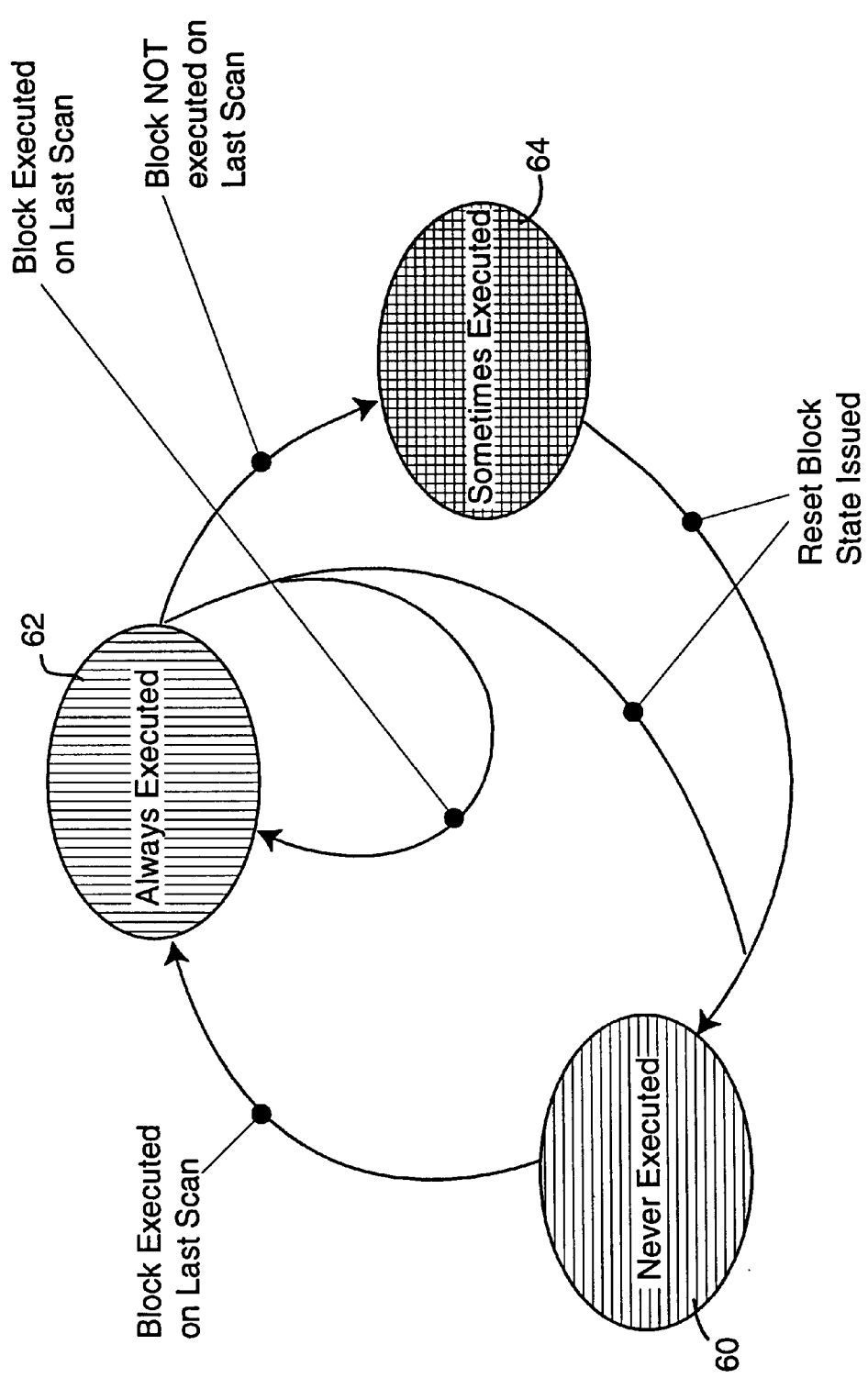
FIG. 4 is a state transition diagram useful in explaining the operation of the preferred embodiment.

Although any suitable state description may be used, the preferred embodiment analyses control program behavior in terms of the three states illustrated in FIG. 4. Referring to FIG. 4, the presently preferred tri-state diagram starts at state 60, depicting that the program block never executed. The preferred implementation uses colors to indicate states and the assigned color for the never-executed state is blue.

From the never-executed state 60 a transition to the always-executed state 62 (red) occurs if the block was executed on the last scan. Starting from state 60, if the block was not executed on the last scan then the state simply remains at the never-executed state 60.

From the always-executed state 62, a transition is made to the sometimes-executed state 64 (yellow) if the block was NOT executed on the last scan. Otherwise, the always-executed state 62 remains unchanged.

Periodically, the system will reset the state variables associated with a given block. A reset may be performed for a number of different reasons, typically because a fresh analysis is requested by the system user. Issuance of a reset forces a return to the never-executed state 60.

More specifically, the reset block state transition may be initiated for any one of the following reasons:

1. Upon initial activation of the program tracker (reset all blocks);
2. The program tracker update interval has completed (reset all blocks);
3. The current block is part of a flowchart that has been edited in an on-line change mode but not yet updated (reset some blocks);
4. The program tracker calls for a reset to begin historical mode operation (reset all blocks);
5. The program tracker requests blocks to be cleared as part of historical mode operation (reset all blocks);
6. The program tracker terminates historical mode operation (reset all blocks);
7. The program tracker is placed in a single step debugging mode, stepping by block or stepping by flowchart (reset all blocks); and
8. The program tracking connection to the runtime engine is terminated (reset all blocks).

The program tracker 50 may be implemented in a number of different ways. An object-oriented approach according to the preferred embodiment will be illustrated here. Specifically, the object-oriented architecture is shown in the Booch diagram of FIG. 5 The system clock object 70 generates a clock tick every N seconds (where 0.1<N<5). The clock tick is supplied to the FlowMain object 72. FlowMain object 72 has the ability to set the clock interval of system clock 70 and it interprets clock ticks as signals to update the control flow information displayed through the flowchart interface 42 (FIG. 3

Figure 5:
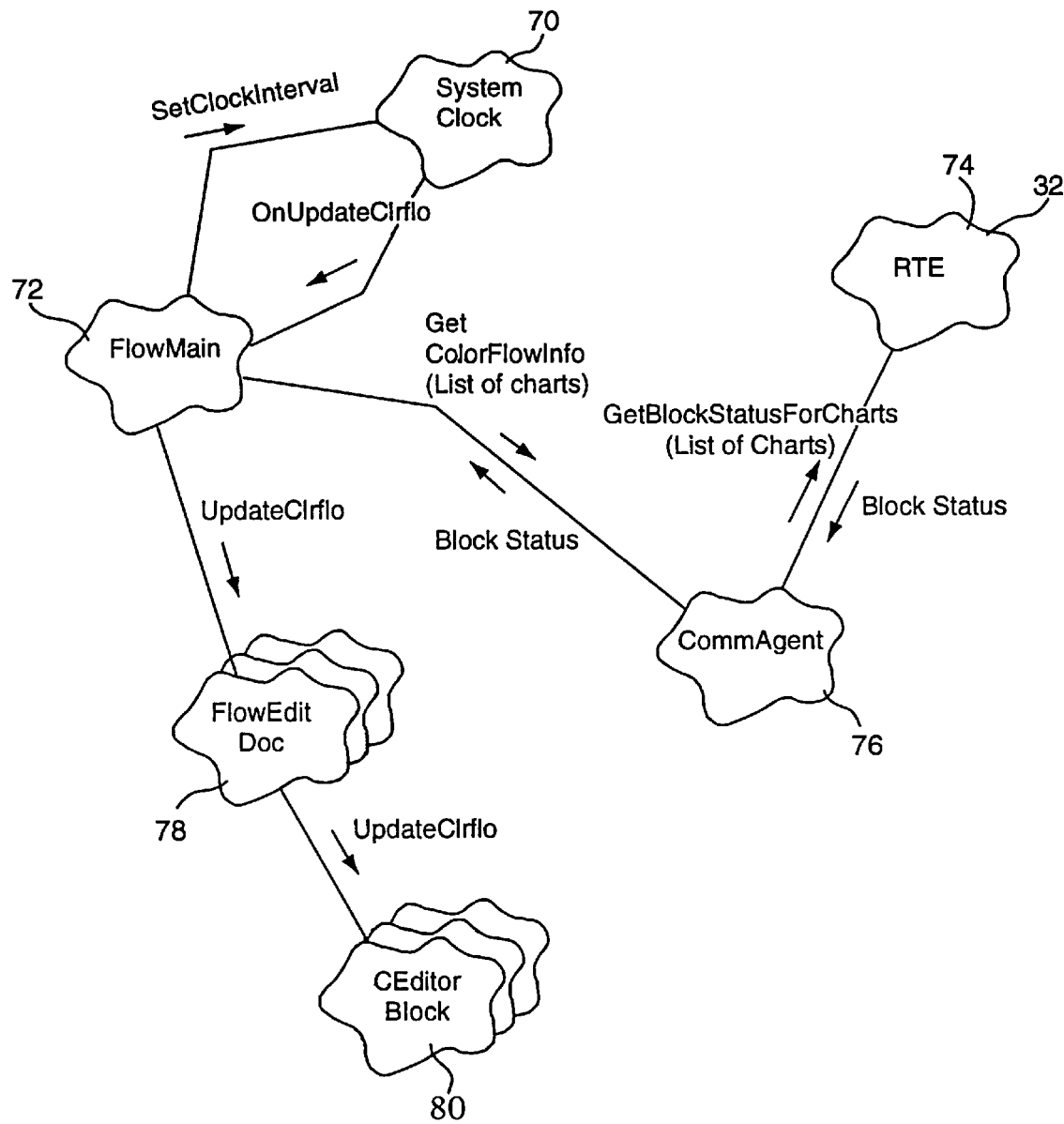
FIG. 5 is a Booch diagram showing the presently preferred, object-oriented implementation.

FlowMain 72 provides a method that is responsible for sorting the raw block state data 56 (FIG. 3) for each flowchart being displayed. State data 56 are maintained by the runtime engine, represented in FIG. 5 by runtime object 32. The block status information is communicated from the runtime engine object 32 to the FlowMain object 32 through the communication mechanisms represented in FIG. 5 as CommAgent 76. As illustrated, block status information flows from RTE object 74 to FlowMain object 72. This data flow is in response to requests from FlowMain object 72. These requests are depicted in FIG. 5 as the message: GetColorFlowInfo and the message GetBlockStatusForCharts.

The FlowMain object 72 in turn passes update control flow messages to one or more instances of the FlowEditDoc object 78. Whereas the FlowMain object was responsible for sorting the raw block status information into state information for each flowchart, the FlowEditDoc object sorts the processed data for each block within a flowchart.

After each editor block has been updated by the FlowEditDoc object 78, the FlowEditDoc object issues an UpdateAllViews command to the editor block 80. As illustrated in FIG. 5, there may be multiple instances of the editor block, corresponding to multiple different flowcharts being displayed by the system. The capability of displaying multiple instances permits a single user to view several flowcharts concurrently and also permits multiple users on a network system to display multiple flowcharts concurrently.

The CEditorBlock is responsible for displaying the correct graphical object corresponding to the control program operations associated with a given block. The CeditorBlock-Ojbect uses the state information passed to it from the FlowEditDoc object 78 to look up the proper color for each displayed object. The CommunicationAgent object 76 gives the RTE object 32 a list of flowcharts that it needs block status information about. The Communication object 76 also notifies the RTE object to start storing state information, to stop storing state information and to select the desired mode of storing to be implemented.

The present embodiment allows the user to specify two different modes of storing: a refresh mode and an historical mode. The refresh mode refreshes the display, by resetting all block state data to the never-executed state after every display interval. The system clock 70 determined the display interval. The historical mode suppresses this reset to the never-executed state. Thus, in historical mode, once a block is marked as always-executed (red) it will not transition to never-executed (blue); and once a block is marked as sometimes-executed (yellow) it will not transition to never-executed (blue) or always-executed (red). The user is provided a means through the graphical user interface to manually clear the states (returning them to never-executed) when operating in the historical mode.

In operation, the program tracker 50 communicates with runtime engine 32 to cause the runtime engine to supply block status information to it through the communication mechanism. The runtime engine maintains state data on each block designated for tracking by the program tracker. The runtime engine maintains state information and communicates this information through the communication mechanism to the program tracker. The program tracker then causes the flowchart to be rendered using different colors or other visual indicia to show the state information of each block.

Figure 6:
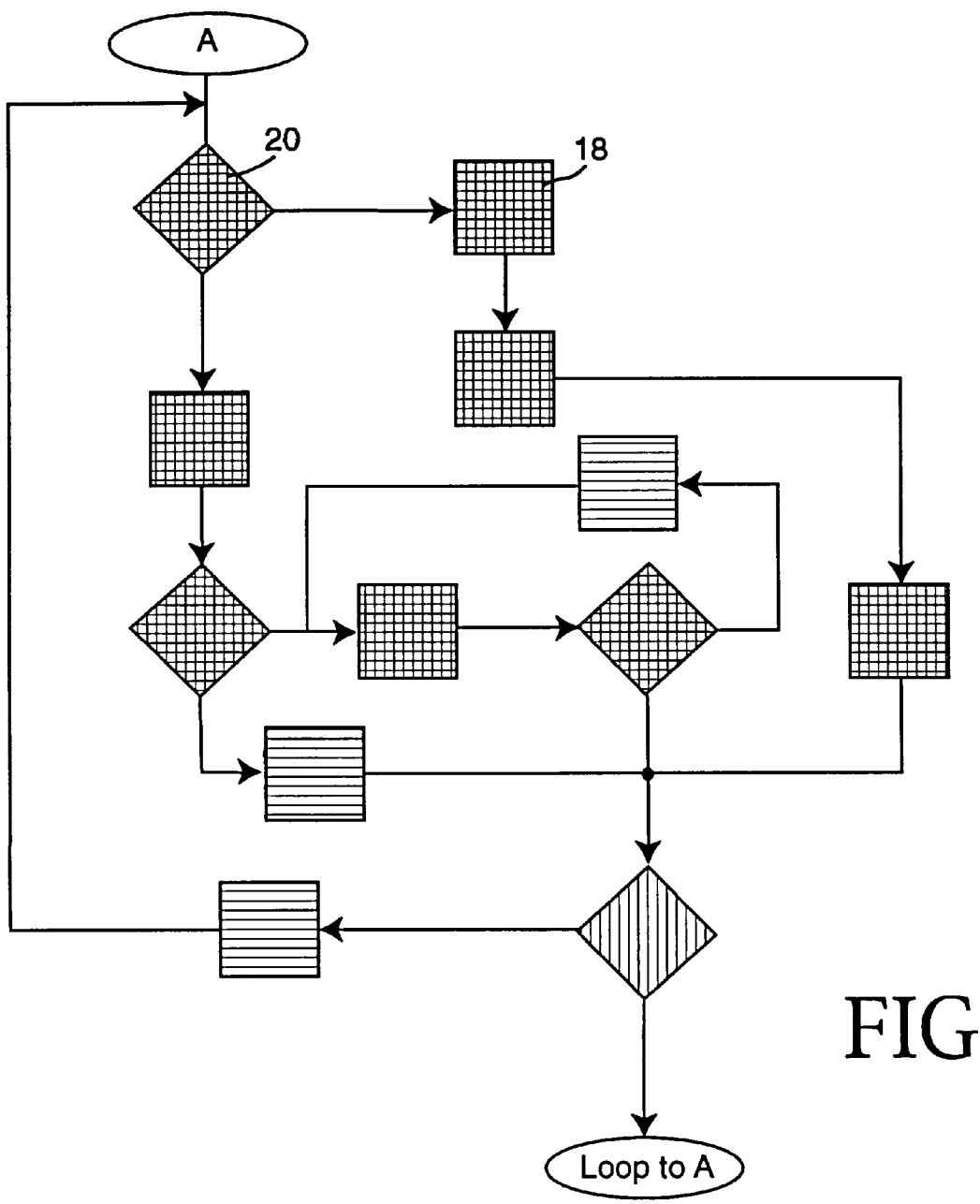
FIG. 6 is a flowchart diagram of the exemplary control program illustrated in FIG. 1, showing how the invention may impart different visual representations to selected graphical objects to reflect runtime performance of the control program. Although the preferred implementation would display different colors to provide different visual representations, different shading is used here for a black-and-white representation better suited to published patent documents.

FIG. 6 illustrates the result. Blocks that executed every time during the scan cycle are colored red; blocks that executed at least once but not every time are colored yellow: and blocks that never executed are colored blue. This display readily communicates to the human operator which branches the control program took during runtime. In FIG. 6, different shading patterns are used to signify different colors.

Although the illustrated embodiment is based on a tri-state model, in general, any n-state model could be used. Thus a system could be constructed to display a range of different colors or other visual indicia, including a range of different brightness intensity levels, color tints and hues, and the like. Also, while the presently preferred implementation displays a flowchart diagram (such as the one illustrated in FIG. 6) other types of diagrams may be used. Such diagrams include ladder logic diagrams, data flow diagrams, system flowchart diagrams, program network charts, and the like.

While the invention has been described in its presently preferred form, it will be understood that the invention is capable of certain modification without departing from the spirit of the invention as set forth in the appended claims.

We claim:

1. A computer-implemented control program tracker for displaying an improved graphical representation of a control program's behavior as it performs runtime control program operations, comprising:

a runtime engine monitor for monitoring the runtime performance of control program operations by said control program;

a memory data structure accessed by said runtime engine for storing a representation of said control program as a plurality of blocks, each block corresponding to at least one of said control program operations, and for storing block state information associated with the runtime performance of said control program operations;

a graphical display engine for generating spatially arranged graphical objects corresponding to said plurality of blocks and arranged to convey information about the relationship of said control program operations;

a tracking module that accesses said memory data structure and communicates with said graphical display engine to selectively impart different visual representations to said graphical objects to reflect the runtime performance of said control program, said visual representation being based upon said block state information being collected over a plurality of scans of the control program.

2. The computer-implemented control program tracker of claim 1 wherein said visual representation is indicative of at least three different states of the runtime performance of said control program.

3. The computer-implemented control program tracker of claim 2 wherein said states of the runtime performance of said control program include an always executed state, a sometimes executed state, and a never executed state.

4. The computer-implemented control program tracker of claim 3 wherein said always executed state exists for a block if said block executed on the last scan of said plurality of scans.

5. The computer-implemented control program tracker of claim 3 wherein said sometimes executed state exists for a block if said block executed in a previous scan of said plurality of scans and if said block did not execute in the last scan of said plurality of scans.

6. The computer-implemented control program tracker of claim 1 wherein said visual representation includes different colors as being indicative of at least three states of the runtime performance of said control program.

7. The computer-implemented control program tracker of claim 1 wherein said visual representation includes different line thicknesses as being indicative of at least three states of the runtime performance of said control program.

8. The computer-implemented control program tracker of claim 1 wherein said control program maintains a record of how many times each block was executed during a predetermined number of program scans.

9. The computer-implemented control program tracker of claim 1 wherein at least one of said blocks includes a decision block, said block state data including data indicative of the number of times said decision block is evaluated as true and false.

10. The computer-implemented control program tracker of claim 1 wherein said control program operates sensors in a substantially real-time operational capability.

11. The computer-implemented control program tracker of claim 1 wherein a historical mode is provided in order to suppress a reset to the never-executed state.

12. The computer-implemented control program tracker of claim 1 wherein a reset mode is provided wherein said visual representation is reset by resetting block state data to the never-executed state after a display interval, said display interval being determined by a system clock.

13. The computer-implemented control program tracker of claim 1 wherein different visual representations are provided substantially concurrently for at least two of said graphical objects.

* * * * *